US010738964B2

(12) United States Patent
Cleto et al.

(10) Patent No.: US 10,738,964 B2
(45) Date of Patent: Aug. 11, 2020

(54) LIGHTING DEVICE FOR A VEHICLE COMPRISING A VENTILATION DEVICE DISPOSED BETWEEN TWO HEAT DISSIPATION DEVICES

(71) Applicant: VALEO VISION, Bobigny (FR)

(72) Inventors: Christophe Cleto, Bobigny (FR); Lotfi Redjem Saad, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days.

(21) Appl. No.: 16/230,015

(22) Filed: Dec. 21, 2018

(65) Prior Publication Data

US 2019/0195463 A1 Jun. 27, 2019

(30) Foreign Application Priority Data

Dec. 22, 2017 (FR) ..................................... 17 62903

(51) Int. Cl.

| | |
|---|---|
| ***B60Q 1/00*** | (2006.01) |
| ***F21S 45/33*** | (2018.01) |
| ***F21S 45/47*** | (2018.01) |
| ***F21S 41/141*** | (2018.01) |

(52) U.S. Cl.

CPC ............ *F21S 45/33* (2018.01); *F21S 41/141* (2018.01); *F21S 45/47* (2018.01)

(58) Field of Classification Search

None

See application file for complete search history.

(56) References Cited

U.S. PATENT DOCUMENTS

| | | | |
|---|---|---|---|
| 2007/0091632 | A1 | 4/2007 | Glovatsky et al. |
| 2017/0130924 | A1 | 5/2017 | Kawai et al. |

FOREIGN PATENT DOCUMENTS

| | | | |
|---|---|---|---|
| DE | 10 2007 043 961 A1 | 3/2009 | |
| EP | 3 173 688 A1 | 5/2017 | |
| JP | 2017-120736 | 7/2017 | |
| WO | WO 2005/116522 A1 | 12/2005 | |

OTHER PUBLICATIONS

French Preliminary Search Report dated Jul. 10, 2018 in French Application 17 62903 filed on Dec. 22, 2017 (with English translation of categories of cited documents).

*Primary Examiner* — Vip Patel

(74) *Attorney, Agent, or Firm* — Oblon, McClelland, Maier & Neustadt, L.L.P.

(57) ABSTRACT

A lighting module for a vehicle, the lighting module including a cooling circuit including a first chamber delimited by a first heat dissipation device, and designed for the cooling of at least one first lighting element of the lighting module, a second chamber delimited by a second heat dissipation device, and designed for the cooling of at least one second lighting element of the lighting module, and a third chamber delimited by a ventilation device. The third chamber separates the first chamber and the second chamber from one another.

20 Claims, 5 Drawing Sheets

LIGHTING DEVICE FOR A VEHICLE COMPRISING A VENTILATION DEVICE DISPOSED BETWEEN TWO HEAT DISSIPATION DEVICES

The invention relates to the field of vehicle headlights. More particularly, it concerns the field of cooling of lighting modules which are designed to be fitted in such headlights.

Document DE 10 2014 10 2870 describes a lighting module comprising a cooling body comprising a base with, firstly, a first face on which means for emission of light are received, and secondly, a second face on which a cooling structure is formed. The lighting module also comprises a ventilation unit which is designed to generate forced convection of the cooling structure.

An objective sought in the aforementioned document is to improve the cooling capacity of the means for emission of light of the lighting module, whilst maintaining its compactness. For this purpose, according to the document, a deflection channel is designed such that it generates deflection of the air between a direction of flow of the flow of air at the output of the ventilation unit, and a direction of flow of the flow of air which passes through the cooling structure.

However, the document cited does not have an application in lighting modules comprising distinctly first means for emission of light and second means for emission of light, wherein these first and second means for emission of light are designed to provide a first lighting function and a second lighting function. In such modules, the first lighting function permits the formation of a first light beam, known as the high beam, whereas the second lighting function permits the formation of a second light beam, known as the low beam.

In this application, the first means for emission of light can be disposed on a first cooling body, whereas the second means for emission of light can be disposed on a second cooling body, distinct from the first body. The solution which is presented in the aforementioned document is not suitable for such a structure, and therefore is not responsible for forced cooling of each of the first and second cooling bodies of the lighting module.

In addition, such a solution applied to these lighting models requires significant structural modifications which contribute towards increasing the production cost of such a lighting module.

The objective of the present invention is to eliminate at least one of the aforementioned disadvantages, and to propose a particular arrangement of a lighting module making it possible to improve the cooling of each of these lighting elements, whilst maintaining its compactness and production cost.

For this purpose, the invention relates to a lighting module for a vehicle, the lighting module comprising a cooling circuit comprising:

- a first chamber delimited by a first heat dissipation device, and designed for the cooling of at least one first lighting element of the lighting module;
- a second chamber delimited by a second heat dissipation device, and designed for the cooling of at least one second lighting element of the lighting module; and
- a third chamber delimited by a ventilation device.

According to the invention, the third chamber separates the first chamber and the second chamber from one another.

The cooling circuit then makes possible cooling by forced convection of each of the first and second heat dissipation devices by means of the ventilation device. In fact, the ventilation device permits the formation of an air draft passing through the first chamber, and thus permitting forced cooling of the first heat dissipation device. The air which circulates in the ventilation device is then accelerated, and directed towards the second chamber, in order to permit the forced cooling of the second heat dissipation device. The solution according to the invention permits the cooling by forced convection of each of the heat dissipation devices by a single ventilation device which is interposed between the first chamber and the second chamber, thus making it possible to maintain the compactness of the lighting module.

Such positioning of the ventilation device clears valuable space at the input or the output of the cooling circuit, which makes it possible to accommodate more easily an actuator of the lighting module which is the subject of the invention.

The cooling circuit is advantageously formed in order to permit the circulation of a flow of air from the first chamber to the second chamber by passing via the third chamber.

According to a particular feature of the invention, the first chamber, the second chamber and the third chamber of the cooling circuit form together the cooling circuit of the lighting module. In other words, the cooling circuit is formed exclusively by the first chamber, the second chamber and the third chamber.

According to an embodiment of the invention, the first heat dissipation device comprises a mouth, and the second heat dissipation device comprises an opening, the mouth forming an input of the first chamber of the cooling circuit, and the opening forming an output of the first chamber of the cooling circuit.

Since the output of the first chamber is an input of the third chamber, it should be noted that the opening of the second heat dissipation device advantageously makes it possible to connect the first chamber to the third chamber fluidly.

According to another embodiment of the invention, the first heat dissipation device comprises a housing and a first heat dissipater, with the housing accommodating the first heat dissipater, and with the mouth, known as the first mouth, and a second mouth, being formed on the housing, such that the second mouth is facing the opening of the second heat dissipation device.

When the second mouth is disposed facing the opening, the second mouth and the opening both form an output of the first chamber.

The opening can comprise a securing bearing surface which cooperates with the second mouth. Such a securing bearing surface advantageously makes it possible to fit the housing of the first heat dissipation device on the second heat dissipation device. This fitting thus contributes towards limiting the losses of load of the flow of air circulating between the first chamber and the third chamber.

Advantageously, the housing comprises a receptacle which is designed to receive the first heat dissipater. The first heat dissipation device thus comprises the first heat dissipater and the housing. The housing delimited by these mouths and its receptacle makes it possible to form the first chamber according to the invention, when the first heat dissipater is received in this receptacle.

More particularly, the first heat dissipater comprises a base comprising a front face and a rear face opposite one another, the front face being designed to receive the at least one first lighting element, and the rear face comprising a cooling structure which extends from the latter. Such a cooling structure serves the purpose of increasing the exchange surface between the heat dissipated by the first heat dissipater and a flow of air which passes through it.

When the first heat dissipater comprises such a base, it is possible to use the rear face of the base in order to close the receptacle of the housing.

The housing is thus preferably formed in order to surround the first heat dissipater, such as to channel the flow of air on the first dissipater and force the exchange of heat between the air and the first dissipater.

Advantageously, the cooling structure of the first heat dissipater is formed by fins. Alternatively, the cooling structure of the first heat dissipater is formed by rods.

According to a particular embodiment of the invention, the second heat dissipation device accommodates the ventilation device. Thanks to this particular feature, it is possible to optimise further the compactness of the lighting module.

According to a characteristic of the invention, the ventilation device comprises an air input and an air output forming respectively an input of the third chamber of the cooling circuit and an output of the third chamber of the cooling circuit.

According to a variant embodiment of the invention, the air input of the ventilation device is facing the opening of the second heat dissipation device.

According to another characteristic of the invention, the second heat dissipation device comprises an aperture, and the air output of the ventilation device forms an input of the second chamber of the cooling circuit, and the aperture forms an output of the second chamber of the cooling circuit.

It should be noted that the air output of the ventilation device thus forms firstly an output of the third chamber, and secondly an input of the second chamber.

According to a variant of the invention, the second heat dissipation device comprises a cover and a heat dissipater, known as the second heat dissipater, with the cover covering at least partly the heat dissipater of the second heat dissipation device, and the opening of the second heat dissipation device being delimited at least partly by the cover.

The cover and the second heat dissipater make it possible to delimit the second chamber. Thus, the cover is preferably assembled on the second heat dissipater in order to allow a flow of air at the input of the second chamber to be distributed in the second chamber.

More particularly, the second heat dissipater comprises a plate comprising a front surface and a rear surface opposite one another, the front surface being designed to receive the at least one second lighting element, and the rear surface comprising a cooling structure which extends from the latter. Such a cooling surface serves the purpose of increasing the exchange surface between the heat dissipated by the second heat dissipater and a flow of air which passes through it.

Advantageously, the cooling structure is formed by rods. Alternatively, the cooling structure is formed by fins.

Advantageously, the cover covers the rear surface of the plate of the second heat dissipater.

According to an embodiment of the invention, the rear surface of the plate and the cover delimit together a volume, the ventilation device being contained in this volume.

In order to preserve this volume, the rear surface of the plate advantageously comprises a flat area against which the ventilation device is rendered integral. By this means, it is possible to incorporate the ventilation device in this volume without increasing the volume.

The ventilation device is advantageously surrounded by the cooling structure of the second heat dissipater. More particularly, the ventilation device is surrounded by the rods of the second heat dissipater.

Advantageously, the at least one first lighting element makes it possible to provide a first lighting function of the lighting module. The first lighting module permits formation of a first light beam, known as the high beam.

Advantageously, the at least one second lighting element makes it possible to provide a second lighting function of the lighting module. The second lighting module permits formation of a second light beam, known as the low beam.

The first lighting function of the lighting module can advantageously be provided by a combination of the at least one first lighting element and the at least one second lighting element.

It should be noted that the first lighting element and the second lighting element are distinct from one another.

According to an advantageous embodiment of the invention, the air output of the ventilation device and the aperture of the second heat dissipation device are designed to channel a flow of air in opposite directions. This particular configuration has the advantage of optimising the forced convection in the second chamber, by forcing the flow of air to follow an undulating circulation path which assists the heat exchanges.

According to another embodiment of the invention, the air output of the ventilation device is designed to orient a flow of air in a first direction perpendicular to a second direction, along which this flow of air passes the air input.

Advantageously, the ventilation device comprises a centrifugal fan. Such a centrifugal fan is of the squirrel cage type, i.e. it comprises a centrifugal wheel.

According to another characteristic of the invention, the lighting module comprises a lens support which covers at least the first heat dissipation device, with the lens support comprising a recess facing the mouth, known as the first mouth. The recess advantageously permits the formation of the air draft when the ventilation device is actuated.

The invention also relates to a headlight for a vehicle, in particular a motor vehicle, comprising a lighting module as described according to the invention of the present document.

An advantageous technical combination concerns a housing as described in the present document, and designed to equip a lighting module.

Advantageously, the housing comprises a lower wall, and upper wall, and a base wall which confines two lateral walls to one another.

Advantageously, the walls of the housing delimit between one another a receptacle in which the first heat dissipater is received.

Advantageously, the upper wall of the housing participates in the formation of a cut-off edge of at least a first lighting element. Such a cut-off edge forms an area without light.

The cut-off edge is advantageously delimited by a front outer border of the upper wall which forms a cut-off line separating a light beam and the area without light.

Advantageously, a mouth, known as the first mouth, is formed in the lower wall of the housing.

Advantageously, a second mouth is formed in the base wall of the housing.

Advantageously, the lateral walls of the housing each comprise a cut-out which is designed for positioning of a heat dissipater, known as the first heat dissipater, as described in the present document, in the receptacle of the housing.

Another subject of this advantageous technical combination concerns a heat dissipation device, known as the first heat dissipation device, as described in the present document, comprising the housing and a heat dissipater, known as the first heat dissipater, as described in the present document.

Other characteristics, details and advantages of the invention will become more apparent from reading the following description provided by way of indication in relation with the drawings, in which.

Figure 1:
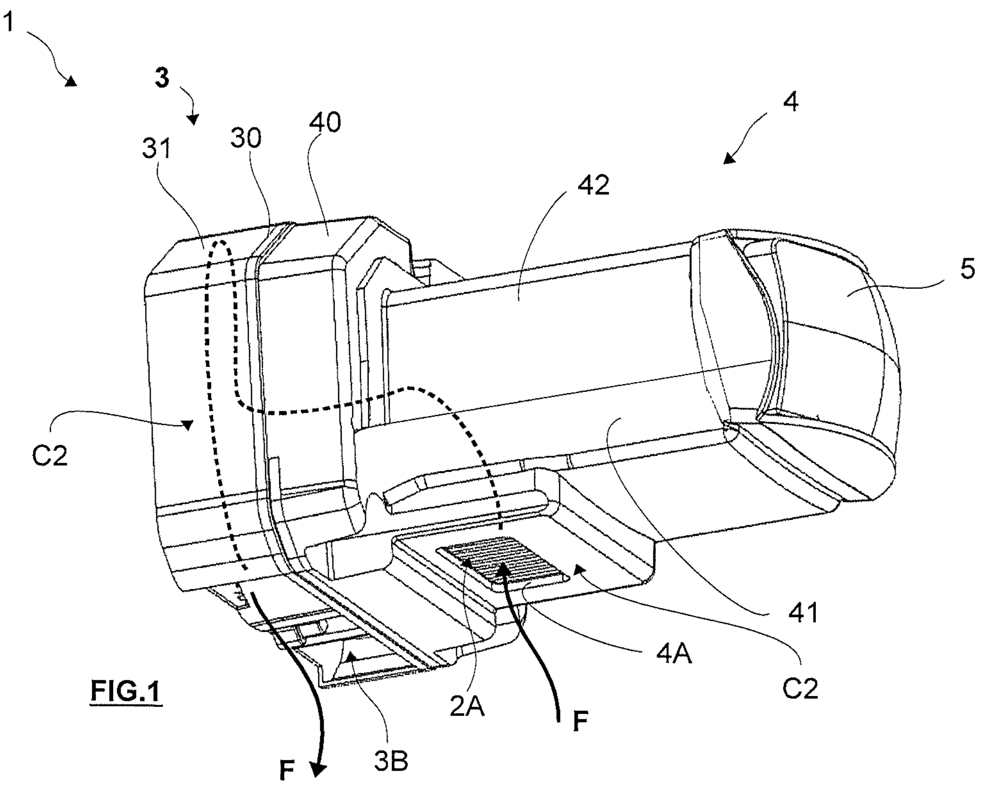
FIG. 1 is a low view in perspective of the front of a lighting module according to the invention.
Figure 2:
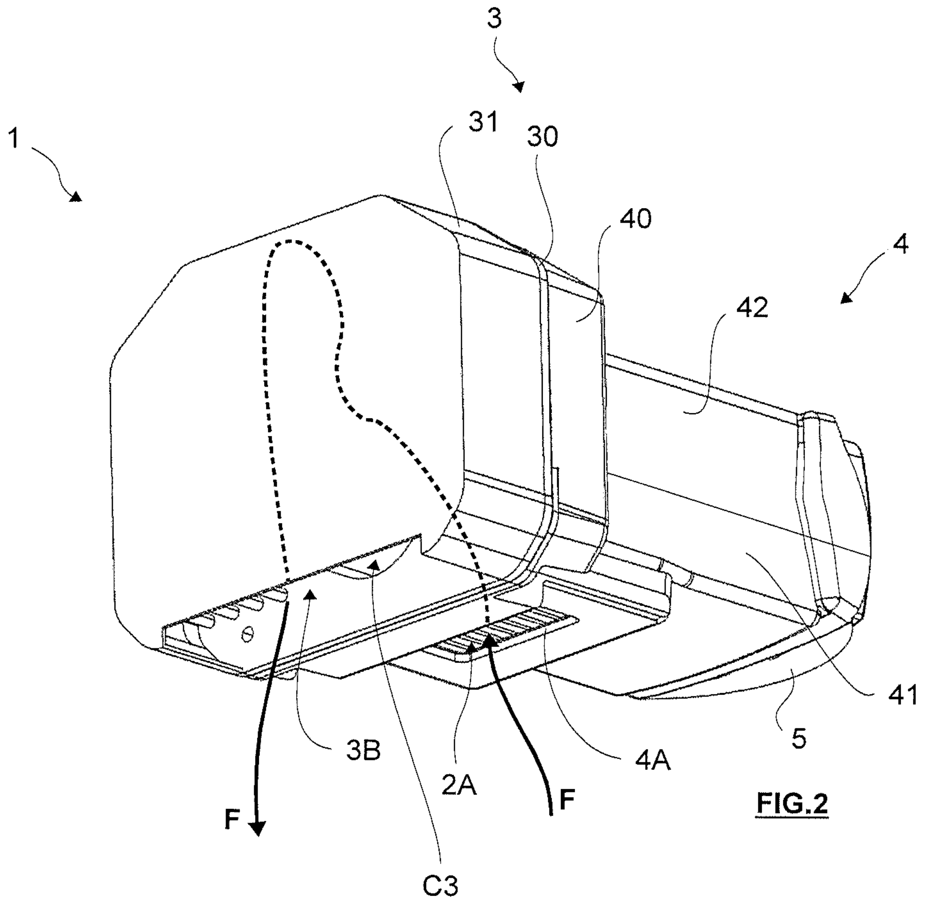
FIG. 2 is a low view in perspective of the rear of the lighting module in FIG. 1.

As illustrated in FIGS. 1 and 2, the lighting module 1 according to the invention is represented in a low view of the front of the lighting module 1 in FIG. 1, and a low view from the rear of the lighting module 1 in FIG. 2. The lighting module 1 is designed to equip a vehicle headlight (not represented). The lighting module 1 is formed by the assembly of a lens support 4 and a cover 31, each disposed on a single heat dissipater 30. In order to permit the projection of light beams emitted by lighting elements received in the lighting module 1, the lighting module 1 comprises a projection lens 5. According to this embodiment, the projection lens 5 is supported by the lens support 4 of the lighting module 1. The lens support 4 is more particularly formed by a lower part 41 and by an upper part 42. The lower part 41 and the upper part 42 of the lens support 4 together accept the projection lens 5. The lower part 41 of the lens support 4 comprises a frame 40 in order to allow it to be secured on the heat dissipater 30.

In the example illustrated in these FIGS. 1 and 2, the lens support 4 of the lighting module 1, more particularly its lower part 41, comprises a recess 4A, and the cover 31 delimits at least partly an aperture 3B. The recess 4A and the aperture 3B form respectively an input of a cooling circuit of the lighting module 1, and an output of this same cooling circuit of the lighting module 1. Such a cooling circuit, which is designed for circulation of a flow of air F, serves the purpose of permitting cooling of the lighting module 1. More particularly, it serves the purpose of permitting cooling of the heat dissipation devices which it comprises.

Figure 3:
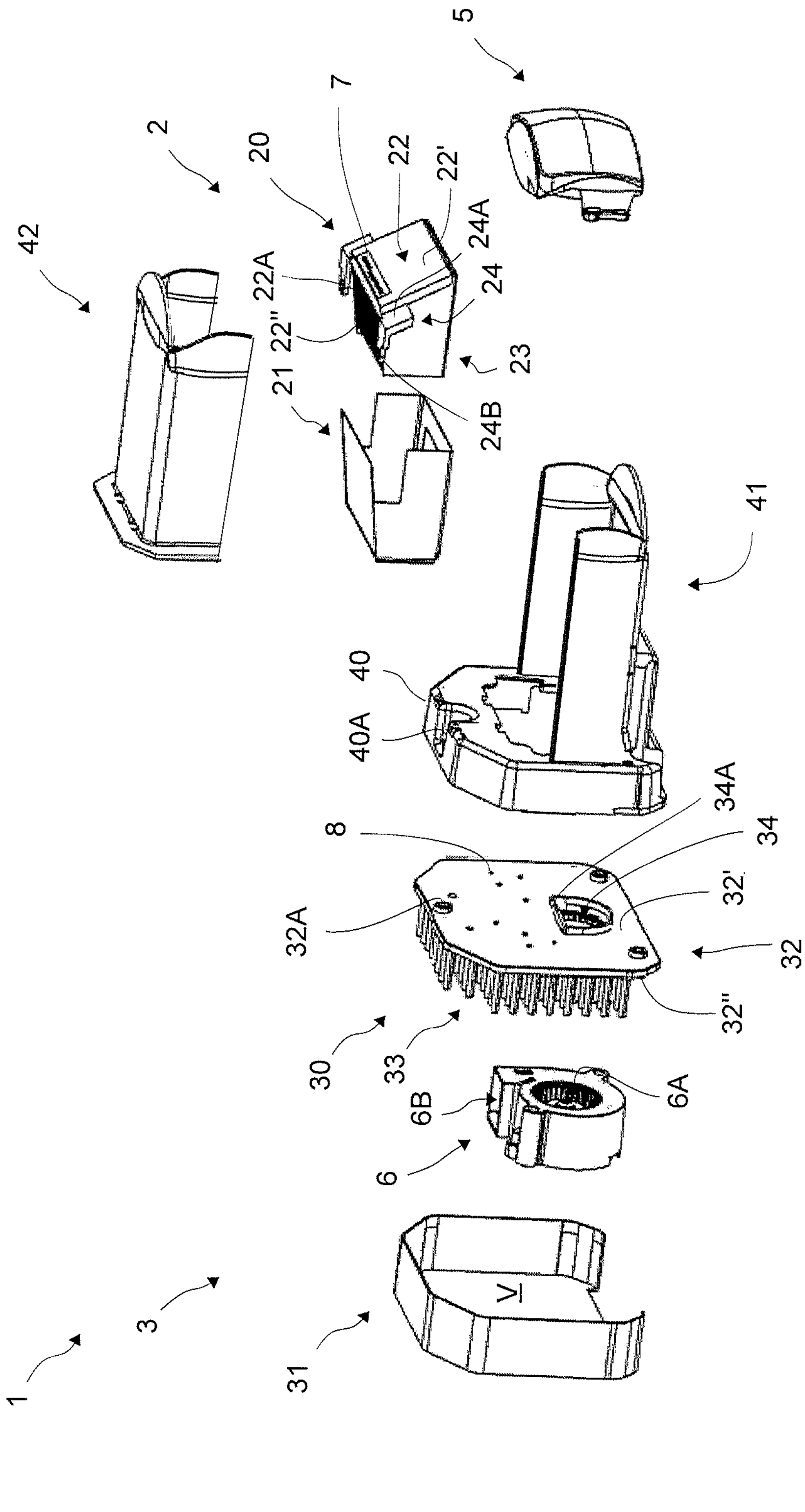
FIG. 3 is an exploded view of the lighting module illustrated in FIGS. 1 and 2.

With reference to FIG. 3, the lighting module 1 is represented in exploded view. Thus, there is representation of the lower part 41 of the lens support 4, the upper part 42 of the lens support 4, the projection lens 5, a first heat dissipation device 2, a second heat dissipation device 3, and a ventilation device 6.

The lens support 4 of the lighting module 1 is assembled by the frame 40 of its lower part 41, from a front surface 32' of the heat dissipater 30, whereas the cover 31 is assembled from a rear surface 32" of the heat dissipater 30.

In greater detail, the first heat dissipation device 2 comprises a first heat dissipater 20 and a housing 21, and the second heat dissipation device 3 comprises a second heat dissipater 30 and the cover 31, as previously described. The ventilation device 6 for its part comprises a centrifugal fan. It should be noted that the second heat dissipater 30 corresponds to the dissipater described in FIGS. 1 and 2.

The first and second heat dissipation devices 2, 3 and the ventilation device 6 are assembled in the lighting module 1 for the purpose of forming the cooling circuit.

With reference to FIG. 3, the lighting module 1 represented makes it possible to provide a first lighting function and a second lighting function. The first lighting function permits the formation of a first light beam, known as the high beam, whereas the second lighting function permits the formation of a second light beam, known as the low beam.

In order to provide these lighting functions, the lighting module 1 comprises first lighting elements 7, and second lighting elements 8, which are distinct from the first lighting elements 7. Advantageously, the first lighting elements 7 and the second lighting elements 8 comprise light-emitting diodes. At least one of the lighting functions can be provided by the combination of the first and second lighting elements 7, 8. Preferably, the first lighting function is provided by the combination of the first lighting elements 7 and the second lighting elements 8, and the second lighting function is provided by the second lighting elements 8.

A description will now be provided in greater detail of each of the first and second heat dissipation devices 2, 3.

With reference to FIG. 3, the first heat dissipation device 2 comprises the first heat dissipater 20 and the housing 21. The first heat dissipater 20 comprises a base 22 comprising a front face 22' and a rear face 22" which are opposite one another. The rear face 22" of the base 22 comprises a cooling structure 23 formed for example by fins 23 extending from this base 22. The fins 23 of the first heat dissipater 20 extend more particularly from the rear face 22" of the base 22, and perpendicularly to it. The front face 22' of the base 22 supports the first lighting elements 7 previously described, which are situated at a high border 22A of the front face 22' of the base 22. The first lighting elements 7 can be aligned horizontally along a single straight line.

Two arms 24 of the first heat dissipater 20 extend laterally from the base 22 of the first heat dissipater 20. Each of these arms 24 comprises a first portion 24A which is designed to position the first heat dissipater 20 in the housing 21, and a second portion 24B which is designed for securing of the first heat dissipater 20 on the lower part 41 of the lens support 4 of the housing 21.

The first portion 24A of each arm 24 extends laterally from the base 22, parallel to the rear face 22" of the base 22, whereas the second portion 24B of each arm 24 extends from the first portion 24A in a direction of orientation of the fins 23. More particularly, each portion 24A, 24B of the arms 24 extends from the base 22 perpendicularly to the fins 23.

Figure 4:
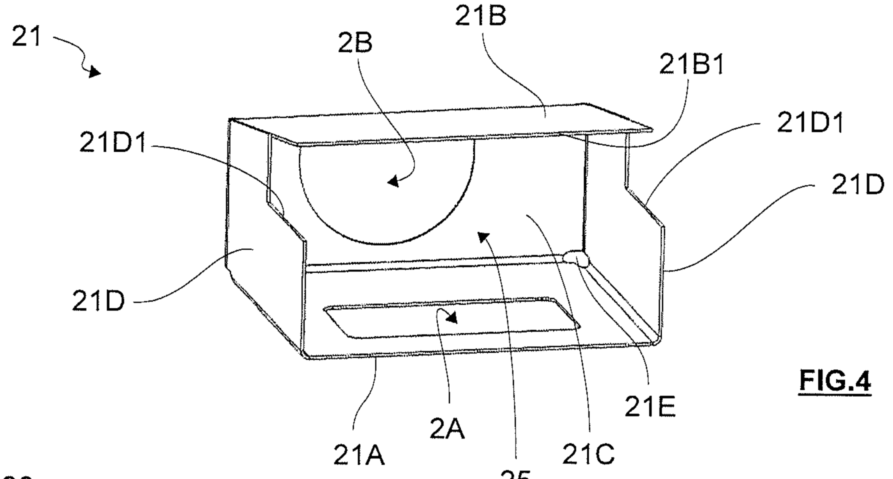
FIG. 4 shows a view in perspective of a housing of the first heat dissipater.

The housing 21 of the heat dissipation device is represented in greater detail in FIG. 4. The housing 21 comprises a lower wall 21A, an upper wall 21B and a base wall 21C which confine between them two lateral walls 21D. The walls 21A-21D of the housing 21 delimit between them a receptacle 25 in which the first heat dissipater 20 is received. A mouth 2A, known as the first mouth 2A, is formed in the lower wall 21A of the housing 21, and a second mouth 2B is formed in the base wall 21C of the housing 21. The lateral walls 21D of the housing 21 each comprise a cut-out 21D1 which is designed to authorise the passage of the arms 24, and to permit the positioning of the first heat dissipater 20 in the receptacle 25 of the housing 21. It will be understood that the first mouth 2A and the second mouth 2B are contained in the first heat dissipation device 2.

Figure 5:
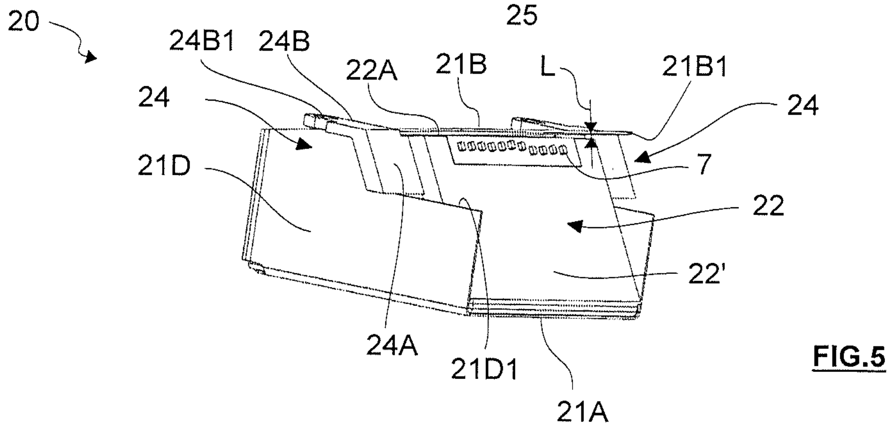
FIG. 5 shows a view in perspective in the assembled state of the first heat dissipation device formed by the housing in FIG. 4, and by a first heat dissipater accommodated in the housing.

As represented in FIG. 5, when the first heat dissipater 20 is accommodated in the receptacle 25 of the housing 21, the first portions 24A of the arms 24 abut the cut-outs 21D1 of the housing 21. In this position of the first portions 24A of the arms 24, the base 22 of the first heat dissipater 20 closes by means of its front face 22' the receptacle 25 of the housing 21, such that a chamber C1, known as the first chamber C1, of the cooling circuit is delimited by each of the walls 21A-21D of the housing 21, and by the base 22 of the first heat dissipater 20, more particularly by the rear face 22" of the base 22. The first mouth 2A and the second mouth 2B of the housing 21 then form respectively an input and an output of the first chamber C1 The cooling structure 23 of the first heat dissipater 20 extends in this first chamber C1.

Optionally, a hole 21E for passage of air can be provided at the intersection of the base wall 21C of the lower wall 21A with each of the lateral walls 21D, as represented in FIG. 4. Such a hole 21E for passage of air has the advantage of eliminating any risk of mechanical interference between the first dissipater 20 and the housing 21, such as to guarantee the position of the first lighting elements 7.

An air blade L can be formed between the base 22 and the upper wall 21B of the housing 21. This air blade L advantageously makes it possible to direct the heat released by the first lighting elements 7 to the inside of the first chamber C1.

Figure 6:
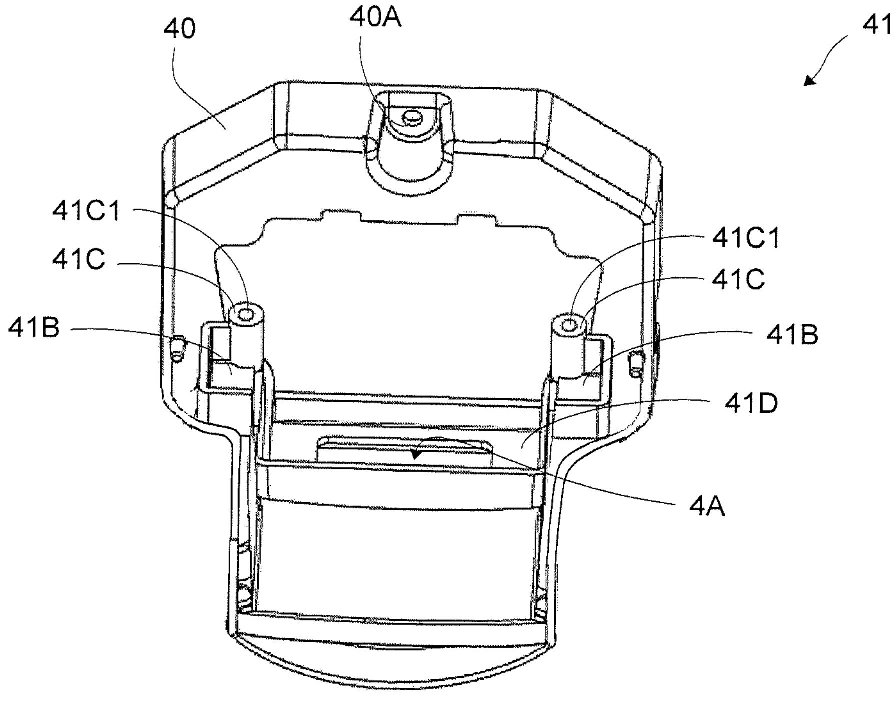
FIG. 6 shows a view from above of a lower part of a lens support of the lighting module designed to receive the first heat dissipation device.

In order to assemble the first heat dissipation device 2 represented in FIG. 5 on the lower part 41 of the lens support 4, represented in FIG. 6, the arms 24 of the first heat dissipater 20 are received in cavities 41B of the lower part 41 of the lens support 4. The first portion 24A of the arms 24 is then supported against the base of each cavity 41B, whereas the second portion 24B of the arms 24 is supported against a stud 41C of the lower part 41 of the lens support 4. A hole 24B1 formed in each second portion 24B of the arms 24 corresponds with a bore 41C1 formed in the corresponding stud 41C. In the assembled position of the first heat dissipation device 2 on the lower part 41 of the lens support 4, the lower wall 21A of the housing 21 is placed against a low wall 41D of the lower part 41 of the lens support 4 comprising the recess 4A previously described, in order to make it possible to position the first mouth 2A of the housing 21 opposite the recess 4A of the lens support 4, and channel the air at the input of the recess 4A of the lens support 4 to the input of the first chamber C1. The first mouth 2A of the housing 21 and the recess 4A of the lens support 4 advantageously have an identical form.

As represented in FIG. 5, the first lighting elements 7 are advantageously recessed relative to a front outer border 21B1 of the upper wall 21B of the housing 21.

With reference once more to FIG. 3, the second heat dissipation device 3 comprises the second heat dissipater 30 and the cover 31. The second heat dissipater 30 comprises a plate 32 comprising a front surface 32' and a rear surface 32" which are opposite one another. The rear surface 32" of the plate 32 comprises a cooling structure 33 formed for example by the rods 33 extending from this plate 32, as represented in FIG. 7.

The front surface 32' of the plate 32 supports the second lighting elements 8 previously described.

The second heat dissipater 30 comprises an opening 34 formed in its plate 32, in order to pass through each of the front and rear surfaces 32', 32" of the plate 32. The opening 34 extends in particular by means of a securing bearing surface 34A, in order to project from the front surface 32' of the plate 32. It will thus be understood that the opening 34 is contained in the second heat dissipation device 3.

Figure 7:
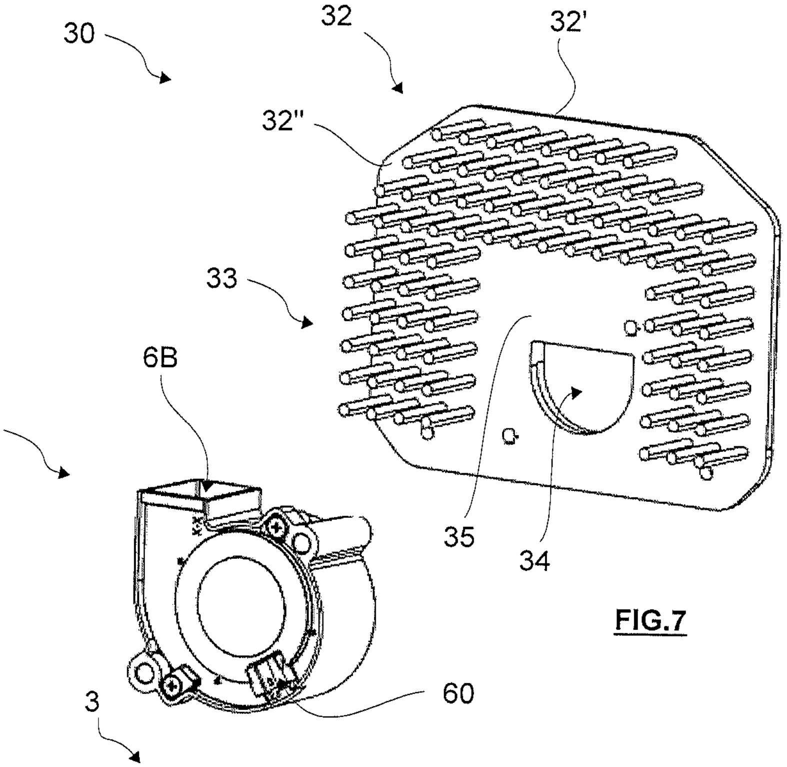
FIG. 7 shows a second heat dissipater of the second heat dissipation device, the second heat dissipater being represented seen from the rear where a rear surface of it is designed to receive the ventilation device.

As represented in FIG. 7, the rear surface 32" of the plate 32 comprises a flat area 35 which is designed to receive the ventilation device 6. The flat area 35 is without a cooling structure 33, thus delimiting a space which is designed to be occupied by the ventilation device 6.

The opening 34 is advantageously formed in order to open onto this flat area 35 of the rear surface 32" of the plate 32.

With reference to FIG. 3, the cover 31 is designed to be fitted against the rear surface 32" of the plate 32, such that the cooling structure 33 of the second heat dissipater 30 is covered by the cover 31. When the cover 31 and the rear surface are assembled to one another, an edge of the cover 31 and an edge of the rear surface 32" of the plate 32 delimit the opening 3B previously described. It will thus be understood that the opening 3B is contained in the second heat dissipation device 3.

In order to allow the cover 31 to be secured on the rear surface 32" of the plate 32, first bores can be provided on the rear surface 32" of the plate 32, in order to correspond with holes formed in the cover 31, such that securing screws can pass through the holes in the cover 31, in order to be accommodated in the first bores, and permit securing of the cover 31 on the rear surface 32" of the plate 32.

The cover 31 and the rear surface 32" of the second heat dissipater 30 delimit together a second chamber C2 of the cooling circuit, an output of which is formed by the opening 3B of the second heat dissipation device 3.

In order to permit the securing of the lower part 41 of the lens support 4 on the front surface 32' of the plate 32, second bores 32A can be provided on the front surface 32' of the plate 32, in order to correspond with holes 40A formed in the frame 40 of the lower part 41, such that securing screws can pass through the holes 40A of the frame 40, in order to be accommodated in the second bores 32A, and permit securing of the frame 40 of the lower part 41 of the lens support 4 on the front surface 32' of the plate 32.

When the lower part 41 of the lens support 4, previously equipped with the first heat dissipation device 2, is fitted on the plate 32 of the second heat dissipater 30, the opening 34 of the second heat dissipater 30 is then facing the second mouth 2B of the first heat dissipation device 2 previously described. Preferably, the securing bearing surface 34A of the opening 34 is designed to fit together with the second mouth 2B. The securing bearing surface 34A and the second mouth 2B preferably have forms which are complementary with one another in order to make possible this arrangement.

With reference to FIG. 3, the ventilation device 6 is accommodated in the second heat dissipation device 3. More particularly, the rear surface 32" of the plate 32 and the cover 31 delimit together a volume V in which the ventilation device 6 is contained.

As illustrated in FIG. 7, the ventilation device 6 is disposed against the flat area 35 of the rear surface 32" of the plate 32 of the second heat dissipater 30. In this arrangement of the ventilation device 6, an air input 6A, shown in FIG. 3, of the ventilation device 6, opens onto the opening 34 of the plate 32 of the second heat dissipater 30. Also, in this arrangement, an air output 6B, shown in FIGS. 3 and 7, of the ventilation device 6, opens into the second chamber C2 of the cooling circuit. The air input 6A and the air output 6B of the ventilation device 6 form respectively an input and an output of a third chamber C3 of the cooling circuit. The opening 34 of the plate 32 of the second heat dissipater 30 forms both an output of the first chamber C1 and an input of the third chamber C3. The ventilation device 6 can be fitted by being screwed on the flat area 35 of the rear surface 32" of the second heat dissipater 30.

The air output 6B of the ventilation device 6 forms an input of the second chamber C2. The air output 6B of the ventilation device 6 and the opening 3B of the second heat dissipation device 3 are each designed to channel a flow of air in opposite directions. According to the example illustrated here, the air output 6B and the opening 3B extend on planes which are parallel, or substantially parallel.

The ventilation device 6 advantageously comprises a centrifugal fan which is configured to allow the air output 6B of the ventilation device 6 to orient a flow of air perpendicularly to its air input 6A.

An electrical supply plug 60 is designed to supply the ventilation device 6 electrically. An electrical supply cable can be provided to pass via the opening 3B of the second heat dissipation device 3, and be connected to the electrical supply plug 60 of the ventilation device 6.

Figure 8:
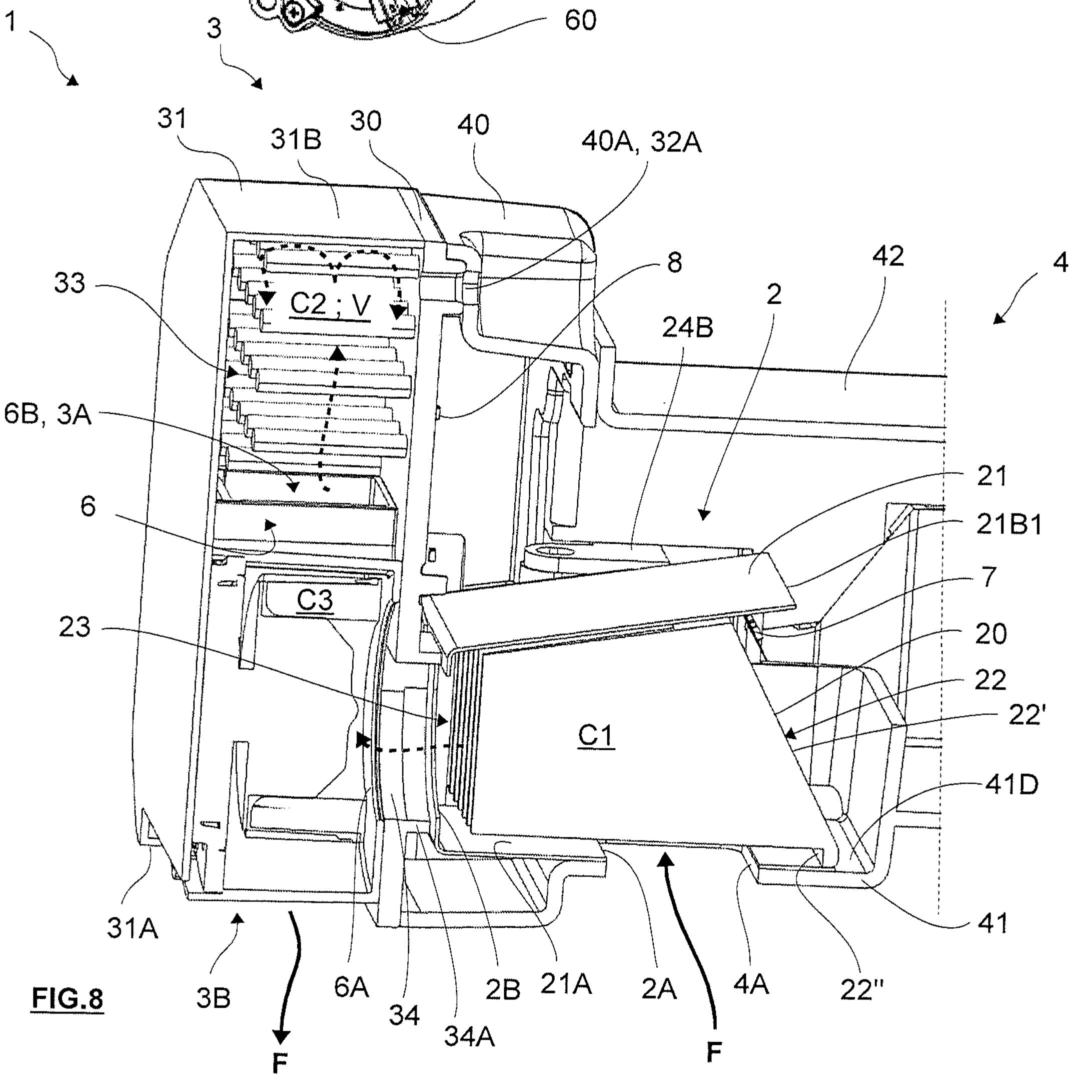
FIG. 8 shows a view in vertical cross-section in perspective of the lighting module illustrated in FIGS. 1 and 2.

With reference to FIG. 8, the cooling circuit of the lighting module 1 is formed in succession by the first chamber C1, the third chamber C3 and the second chamber C2, delimited respectively by the first heat dissipation device 2, the ventilation device 6, and the second heat dissipation device 3. A flow of air F is represented passing through the first heat dissipation device and the second heat dissipation device, via the ventilation device.

It can be noted from the foregoing information that the third chamber C3 separates the first chamber C1 and the second chamber C2 from the cooling circuit.

In greater detail, it should be noted that:

- the input 2A of the first chamber C1 forms an input of the cooling circuit;
- the output 2B of the first chamber C1 forms an input of the third chamber C3;
- the output 6B of the third chamber C3 forms an input 3A of the second chamber C2;
- the output 3B of the second chamber C2 forms an output of the cooling circuit.

A description will now be provided of the operation of the cooling circuit with reference to FIG. 8, where the lighting module 1 is represented by a view in vertical cross-section.

The view in cross-section in FIG. 8 represents the lighting module 1 comprising:

- the first mouth 2A of the first heat dissipation device 2 forming the input 2A of the first chamber C1, and having a form identical to the recess 4A of the lower part 41 of the lens support 4;
- the second mouth 2B of the first heat dissipation device 2 forming the output 2B of the first chamber C1;
- the air input 6A of the ventilation device 6 forming the input 6A of the third chamber C3;
- the opening 34 of the second heat dissipation device 3 connecting the output 2A of the first chamber C1 and the input 6A of the third chamber C3 fluidly;
- the air output 6B of the ventilation device 6 forming the output 6B of the third chamber C3 and the input 3A of the second chamber C2;
- the opening 3B of the second heat dissipation device 3 forming the output 3B of the second chamber C2.

When the ventilation device 6 is controlled electrically, it generates at its air input 6A and air draft making it possible to direct a flow of air F from the input 2A of the first chamber C1 to the output 2B of the first chamber C1. This air draft advantageously makes it possible to force the cooling of the fins 23 of the first heat dissipater 20 which are contained in the first chamber C1. Subsequently, the flow of air F is directed to the input 6A of the third chamber C3 via the opening 34, in order to be accelerated by the centrifugal fan, before being discharged into the second chamber C2 from the output 6B of the third chamber C3, also forming an input 3A of the second chamber C2. The flow of air F is then directed from the input 3A of the second chamber C2 to a first wall 31A of the cover 31 opposite a second wall 31B of the cover 31, delimiting partly the opening 3B of the second heat dissipation device 3. The air output 6B is oriented such that the flow of air F is directed towards, and comes up against, the first wall 31A of the cover 31. This therefore optimises the forced convection in the second chamber C2 by forcing the flow of air F to change direction through the cooling structure 33 of the second heat dissipater 30, thus increasing the exchange of heat between the dissipater 32 and the flow of air.

Figure 9:
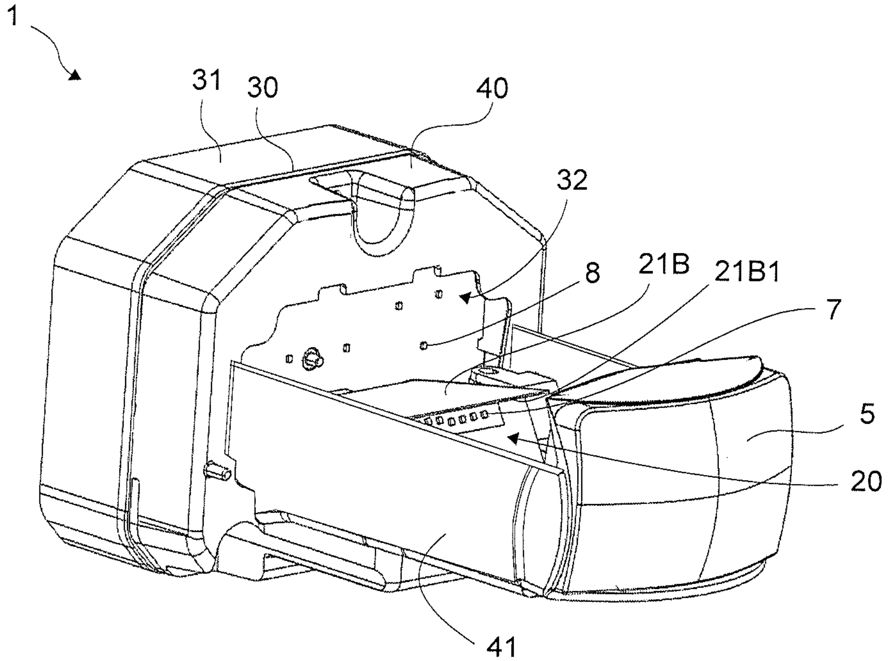
FIG. 9 shows the lighting module according to the invention without an upper part of a lens support of the lighting module.

With reference to FIG. 9, the lighting module 1 is represented without the upper part 42 of the lens support 4, but with the lower part 41 of the lens support 4. The first heat dissipation device 2 and the second heat dissipation device 3 are disposed relative to one another in order to provide the first and second lighting functions of the lighting module 1. More particularly, in this arrangement, the first lighting elements 7 supported by the first heat dissipater 20, and the second lighting elements 8 supported by the second heat dissipater 30 are disposed on their respective heat dissipater 20, 30 such as to be separated by a cut-off edge.

The cut-off edge is advantageously formed by the upper wall 21B of the housing 21. more particularly, the cut-off edge is formed by the front outer border 21B1. The cut-off edge makes it possible to prevent the emission of light by the first lighting elements 7 above the cut-off edge. This advantageously makes it possible to provide the first lighting function, i.e. the formation of a first light beam, known as the high beam, which can be projected from the projection lens 5. It will be understood that, when the first lighting function is provided, the first and second lighting elements 7, 8 are used.

When the second lighting function of the lighting module 1 is required, the emission of light by the second lighting elements 8 is advantageously projected by the projection lens 5 in order to form the second light beam, known as the low beam. It will be understood that, when the second lighting function is provided, the first lighting elements 7 are not used.

It will be appreciated that the characteristics, variants and different embodiments of the invention can be associated with one another according to different combinations, provided that these are not incompatible or mutually exclusive. It is possible in particular to conceive of variants of the invention which comprise only a selection of characteristics described hereinafter in a manner isolated from the other characteristics described, if this selection of characteristics is sufficient to provide a technical advantage, or to differentiate the invention from the prior art.

The invention claimed is:

1. A lighting module for a vehicle, the lighting module comprising:

a cooling circuit comprising:

a first chamber delimited by a first heat dissipation device, and designed for cooling of at least one first lighting element of the lighting module, the at least one first lighting element of the lighting module facing against the first chamber, the at least one first lighting element being placed against a first front surface of the first chamber;

a second chamber delimited by a second heat dissipation device, and designed for cooling of at least one second lighting element of the lighting module, the at least one second lighting element of the lighting module facing against the second chamber, the at least one second lighting element being placed against a second front surface of the second chamber; and a third chamber delimited by a ventilation device, wherein the third chamber separates the first chamber and the second chamber from one another.

2. The lighting module according to claim 1, wherein the first chamber, the second chamber and the third chamber of the cooling circuit form together the cooling circuit of the lighting module.

3. The lighting module according to claim wherein the first heat dissipation device comprises a mouth, and the second heat dissipation device comprises an opening, and wherein the mouth forms an input of the first chamber of the cooling circuit, and the opening forms an output of the first chamber of the cooling circuit.

4. The lighting module according to claim 3, wherein the first heat dissipation device comprises a housing and a first heat dissipater, with the housing accommodating the first heat dissipater, and with the mouth, known as a first mouth, and a second mouth, being formed on the housing, such that the second mouth is facing the opening of the second heat dissipation device.

5. The lighting module according to claim 1, wherein the second heat dissipation device accommodates the ventilation device.

6. The lighting module according to a claim 1, wherein the ventilation device comprises an air input and an air output forming respectively an input of the third chamber of the cooling circuit and an output of the third chamber of the cooling circuit.

7. The lighting module according to claim 6, wherein the air input of the ventilation device is facing an opening of the second heat dissipation device.

8. The lighting module according to claim 6, wherein the second heat dissipation device comprises an aperture, and wherein the air output of the ventilation device forms an input of the second chamber of the cooling circuit, and the aperture forms an output of the second chamber of the cooling circuit.

9. The lighting module according to claim 8, wherein the second heat dissipation device comprises a cover and a heat dissipater, known as a second heat dissipater, with the cover covering at least partly the heat dissipater of the second heat dissipation device, and wherein an opening of the second heat dissipation device is delimited at least partly by the cover.

10. The lighting module according to claim 9, wherein the second heat dissipater comprises a plate comprising the second front surface and a rear surface opposite one another, the second front surface being designed to receive the at least one second lighting element, and the rear surface comprising a cooling structure which extends from the rear surface.

11. The lighting module according to claim 10, wherein the rear surface of the plate and the cover delimit together a volume, the ventilation device being contained in this volume.

12. The lighting module according to claim 10, wherein the rear surface of the plate comprises a flat area against which the ventilation device is rendered integral.

13. The lighting module according to a claim 8, wherein the air output of the ventilation device and the aperture of the second heat dissipation device are designed to channel a flow of air in opposite directions.

14. The lighting module according to claim 6, wherein the air output of the ventilation device is designed to orient a flow of air in a first direction perpendicular to a second direction, along which this flow of air passes the air input.

15. A headlight for the vehicle, wherein the headlight comprises the lighting module according to claim 1.

16. The lighting module according to claim 2, wherein the first heat dissipation device comprises a mouth, and the second heat dissipation device comprises an opening, and wherein the mouth forms an input of the first chamber of the cooling circuit, and the opening forms an output of the first chamber of the cooling circuit.

17. The lighting module according to claim 2, wherein the second heat dissipation device accommodates the ventilation device.

18. The lighting module according to a claim 2, wherein the ventilation device comprises an air input and an air output forming respectively an input of the third chamber of the cooling circuit and an output of the third chamber of the cooling circuit.

19. The lighting module according to claim 7, wherein the second heat dissipation device comprises an aperture, and wherein the air output of the ventilation device forms an input of the second chamber of the cooling circuit, and the aperture forms an output of the second chamber of the cooling circuit.

20. The lighting module according to claim 11, wherein the rear surface of the plate comprises a flat area against which the ventilation device is rendered integral.

* * * * *